United States Patent
Harnett et al.

(10) Patent No.: US 7,225,683 B2
(45) Date of Patent: *Jun. 5, 2007

(54) COMPOSITION PULSE TIME-OF-FLIGHT MASS FLOW SENSOR

(75) Inventors: Cindy K. Harnett, Livermore, CA (US); Robert W. Crocker, Fremont, CA (US); Bruce P. Mosier, San Francisco, CA (US); Pamela F. Caton, Berkeley, CA (US); James F. Stamps, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 10/661,401

(22) Filed: Sep. 11, 2003

(65) Prior Publication Data

US 2005/0034534 A1    Feb. 17, 2005

Related U.S. Application Data

(63) Continuation-in-part of application No. 10/210,647, filed on Jul. 31, 2002, now Pat. No. 6,675,660.

(51) Int. Cl.
*G01F 1/58*   (2006.01)
(52) U.S. Cl. .................................................. 73/861.12
(58) Field of Classification Search ............. 73/861.12, 73/861.14, 861.15
See application file for complete search history.

(56) References Cited

U.S. PATENT DOCUMENTS 6,221,226 B1    4/2001    Kopf-Still
6,675,660 B1 *  1/2004    Mosier et al. ........... 73/861.07

OTHER PUBLICATIONS

Jin Wu, Willy Sansen, Electrochemical time of flight flow sensor, Sensore and Actuators A 97-98 (2002) 68-74 Elsevier.
Daisuke Satake et al., A sensor for blood cell counter using MEMS technology, Sensors and Actuators, B 83 (2002) 77-81, Elsevier.

* cited by examiner

*Primary Examiner*—Jewel V. Thompson
(74) *Attorney, Agent, or Firm*—Donald A. Nissen

(57) ABSTRACT

A device for measuring fluid flow rates over a wide range of flow rates (<1 nL/min to >10 μL/min) and at pressures at least as great as 2,000 psi. The invention is particularly adapted for use in microfluidic systems. The device operates by producing compositional variations in the fluid, or pulses, that are subsequently detected downstream from the point of creation to derive a flow rate. Each pulse, comprising a small fluid volume, whose composition is different from the mean composition of the fluid, can be created by electrochemical means, such as by electrolysis of a solvent, electrolysis of a dissolved species, or electrodialysis of a dissolved ionic species. Measurements of the conductivity of the fluid can be used to detect the arrival time of the pulses, from which the fluid flow rate can be determined. A pair of spaced apart electrodes can be used to produce the electrochemical pulse. In those instances where it is desired to measure a wide range of fluid flow rates a three electrode configuration in which the electrodes are spaced at unequal distances has been found to be desirable.

40 Claims, 5 Drawing Sheets

COMPOSITION PULSE TIME-OF-FLIGHT MASS FLOW SENSOR

CROSS-REFERENCE TO RELATED APPLICATIONS

This application is a Continuation-in-Part of prior application Ser. No. 10/210,647, filed Jul. 31, 2002, now U.S. Pat. No. 6,675,660.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates generally to a device, capable of operating at high pressure, for the detection of fluid flow rates over a wide range of flow rates (<1 nL/min to >10 µL/min) and particularly for measuring fluid flow rates in microfluidic devices.

BACKGROUND OF THE INVENTION

Numerous types of mass flow meters are generally available. Some are based on viscous drag, others employ the Venturi effect to measure a pressure drop, still others use positive displacement either rotary or linear. For low flow rates, local heating of a passing fluid and a variation in the resistance of a resistive element or the current/voltage required to maintain a constant temperature/current in the resistive element is conventionally used to determine fluid flow rate, wherein the fluid can be either a liquid or a gas. Rudent et al. in U.S. Pat. No. 6,354,150 "Sensor for a Capillary Tube of a Mass Flow Meter", issued Mar. 12, 2002, describe a mass flow rate sensor based on the time-of-flight of a thermal pulse. The time-of-flight of a small volume of liquid is measured from an upstream position where the temperature is modified to a downstream detector. However, the thermal sensor requires specially insulated components to avoid thermal transients, which can be a disadvantage.

Wu and Sansen (Wu, J. and Sansen, W. *Electrochemical time of flight flow sensor*, Sensors and Actuators, 97, 68–74, Apr. 1, 2002) describe a time of flight flow sensor for measuring the flow rates of aqueous fluids in the range of 1–15 µL/min. The device uses an in situ electrochemically produced tracer to determine fluid flow rate and is comprised of two electrochemical cells integrated in the flow channel. An upstream electrochemical cell functions as an oxygen producer and a downstream electrochemical cell functions as an amperometric oxygen detector. Oxygen produced at the upstream cell by an electrochemical pulse is detected at the downstream amperometric cell and the flow rate is determined by the time difference between the two pulses. However, this device suffers from the limitation that it is unable to measure fluid flow rates less than about 1 µL/min (1000 nL/min) due to limitations of the oxygen sensor (ibid., p. 71).

SUMMARY OF THE INVENTION

The invention is directed generally to a device and method for measuring fluid flow rates that can range from less than 1 nL/min to greater than 10 µL/min, and particularly for measuring flow rates in microfluidic devices. The invention operates by producing localized compositional variations in the fluid at distinct locations along the flow axis. The time required for the compositional variation, or pulse, to be detected downstream from its point of creation is used to derive a flow rate. The pulse, comprising a narrow zone in the fluid whose composition is different from the mean composition of the fluid, can be created by electrochemical means, such as by electrolysis of a solvent, electrolysis of a dissolved species, or electrodialysis of a dissolved ionic species.

In contrast to prior art thermal flow sensors, the present invention is thermally robust in that no insulation is required to avoid thermal transients and it retains superior sensitivity as it is scaled down to the nanoliter flow rate regime and sub-millimeter dimension. Decreasing the scale of thermal flow sensors increases the heat transfer rate from the heated fluid volume to the surroundings due to a high surface-to-volume ratio and small length scale. This results in poor signal-to-noise at small flow rates (≈nL/min). In contrast, a composition pulse, such as produced here, retains its signal-to-noise ratio because mass diffusion is confined to the fluid and mass diffusivity is much smaller than thermal diffusivity. Moreover, this device is capable of operating at pressures as great as 2,000 psi, limited only by the strength of the materials of construction.

The invention is directed to a device for detecting the mass flow rate of a fluid that includes:
  means for producing localized compositional variations in the fluid along the flow axis; and
  means for subsequently detecting the compositional variation at a point downstream from its point of creation, wherein said device is capable of measuring flow rates from less than about 1 nL/min to greater than about 10 µL/min at pressures as great as 2,000 psi.

In one embodiment of the invention, the device comprises:
  spaced-apart electrodes disposed along the flow axis in a fluid flow channel;
  means for supplying a voltage to the electrodes to produce a local compositional variation in a fluid;
  means for detecting the compositional variation; and
  means for determining time-of-flight of the variation.

It can be advantageous to incorporate a flight tube into the flow channel as part of the detector means. The flight tube is concentric with flow channel and adjoined to the fluid exit of the flow channel and preferably smaller in diameter than the flow channel in order to achieve a high Reynolds number for rapid transport of the ions to the bulk flow. As will be appreciated by those skilled in the art, the dimensions of the flight tube can be selected for a particular flowrate range, fluid viscosity, and ion diffusivity to govern mass transport and hence, the response time and sensitivity of detection of the pulse produced by the upstream electrodes.

Thus, in another embodiment the invention is directed to a device for detecting the mass flow rate of a fluid in a flow channel that can be a capillary channel or microfluidic device that includes:
  a flight tube attached to the fluid exit of the flow channel and concentric with the flow channel, wherein the internal diameter of the flight tube is less than that of the flow channel;
  at least a pair of spaced-apart electrodes disposed along the flow axis in a fluid flow channel;
  means for supplying a voltage to the electrodes to produce a local compositional variation in a fluid;

means for detecting the compositional variation, wherein said means for detecting is disposed in said flight tube; and means for determining time-of-flight of the variation.

For those applications wherein the fluid flow rate is in the range of less than about 100 nL/min to greater than about 500 nL/min, measurement of the fluid flow rate using the aforementioned configuration can be difficult thus, it has been found desirable to employ an electrode configuration that includes an additional ground electrode.

In yet another embodiment, the invention is directed to a device, comprising:

At least three electrodes, wherein said electrodes are spaced an unequal distance apart and disposed along the fluid flow axis in a flow channel;

means for applying a voltage to the electrodes to produce a local compositional variation in the fluid;

means for detecting the compositional variation;

means for determining the time-of-flight of the variation.

BRIEF DESCRIPTION OF THE DRAWINGS

The accompanying drawings, which are incorporated in and form part of the specification, illustrate the present invention and, together with the description, explain the invention. In the drawings, like elements with like functions are referred to by like numbers.

DETAILED DESCRIPTION OF THE INVENTION

Figure 1:
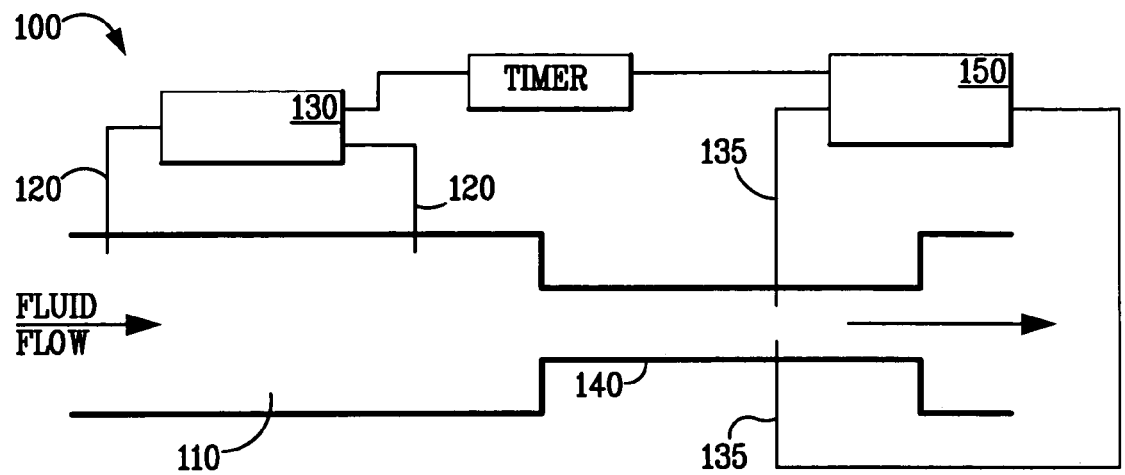
FIG. 1 shows a schematic embodiment of the invention.

An embodiment of the invention and its operation are illustrated schematically in FIG. 1. Flow sensor 100 comprises a flow channel 110 having a single fluid entrance and a single exit where fluid flow is from left to right. A pair of spaced-apart electrodes 120 for producing an electrochemical pulse, or pair of pulses, one on each electrode, and consequent variation in composition of the fluid, including changes in the concentration of some component in the fluid, is disposed within the flow channel and along the flow axis. Means for supplying a voltage pulse to the electrodes, such as power supply 130, is connected to the electrodes. A flight tube 140 that is concentric with flow channel 110 can be adjoined to the fluid exit of the flow channel. As will be appreciated by those skilled in the art, the dimensions of the flight tube can be selected for a particular flowrate range and fluid properties such as viscosity and ionic diffusivity to govern mass transport and hence, the pressure drop, response time interval and sensitivity of detection of the pulse produced by the upstream electrodes. The flight tube is preferably smaller in diameter than the flow channel with a length greater than about four times the diameter in order to achieve rapid transport of the ions to the bulk flow and conveniently short pulse flight times at low flow rates. By way of example, for a flow channel 100 μm in diameter carrying a flow ranging between 10 and 1000 nanoliters/minute, the flight tube is preferably ≈5–15 μm in diameter and 0.5 to 2.0 mm long. Detector 150 is designed to detect the pulse in the fluid produced by electrodes 120 and generally comprises a pair of wire electrodes 135, preferably stainless steel wires or more preferably platinum, palladium, or gold wires, opposite each other and disposed within the flight tube or proximate its exit. Generally, detector 150, located within flight tube 140, can be a conductivity sensor that detects changes in conductivity of the fluid caused by changes in the composition of the fluid. Flow rate of the fluid is measured by determining the flight time, the time difference between the creation of the electrochemical pulse and the arrival of the pulse at the detector.

The composition variation needed to determine fluid flow rate can be produced in different ways, examples are given below.

An electrochemical pulse can be generated by electrolysis of the fluid itself by applying a brief (<1 sec) electrical current or voltage pulse between electrodes 120 to produce an electrical charge pulse in the range of 1–100 microcoulombs. One of the pair of spaced-apart electrodes acts as an anode and at that electrode one or more species can be oxidized. The operation of the flow sensor in this mode can be exemplified by water as the fluid.

Electrolytic oxidation of water under neutral or acidic conditions produces oxygen gas, a portion of which remains dissolved in the water, and hydrogen ions. Consequently, the fluid adjacent the anode becomes more conductive. At the second of the pair of electrodes, the cathode, hydrogen ions are reduced to neutral hydrogen, thereby depleting the region around the cathode of ions and reducing its conductivity. Under basic conditions, the opposite is true. Thus, two pulses or regions of compositional variation are created at the electrodes and their presence can be detected downstream by measuring changes in conductivity of the fluid.

An electrochemical pulse useful for measuring fluid flow rate can also be produced by electrolysis of dissolved species, such as a redox couple. As before, local composition variations, i.e., pulses, will be formed by electrochemical oxidation or reduction of the redox couple at each electrode, thereby producing a region of increased or decreased conductivity that can be used to determine fluid flow rate.

Figure 2:
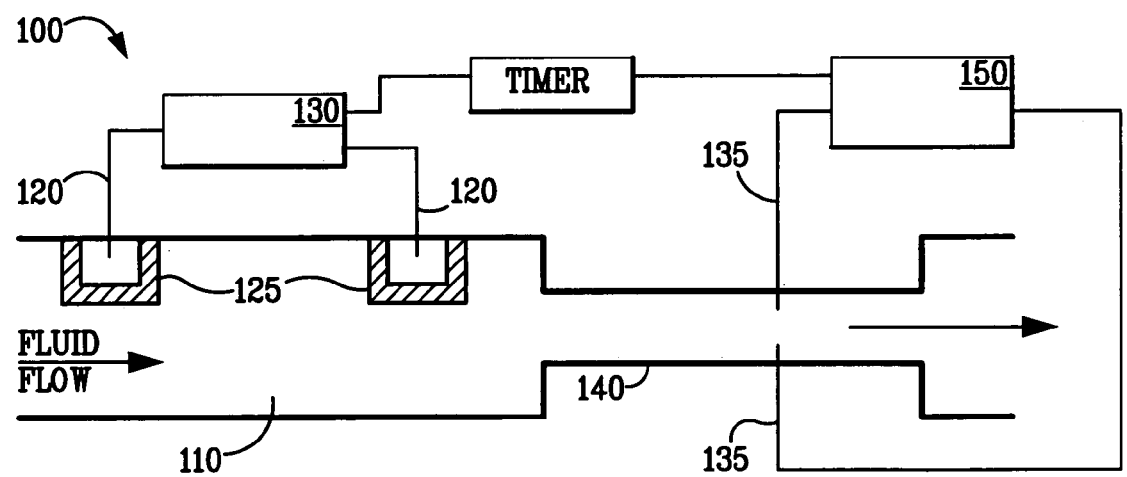
FIG. 2 shows a second embodiment.

Electrodialysis is another method of producing an electrochemical pulse in a flowing fluid. The advantage of electrodialysis is that there is no direct electrolysis of any species in the fluid flow path, thereby avoiding creating undesirable byproducts in the fluid such as oxidizing or reducing species that could interfere with downstream processes. More importantly, the use of electrodialysis avoids the formation of electrolytic gas bubbles that could change the fluid flow regime and interfere with analytical instrumentation. An embodiment of the invention, wherein an electrochemical pulse is produced by electrodialysis is shown in FIG. 2. Here, the pulse electrodes 120 are separated from the fluid by outer body 125 that is a material or membrane that provides for diffusion of water into electrode 120 but not diffusion out of gas bubbles. The outer body or membrane can be made from ultra micro-porous, or nanoporous, glass or an ionomer material. A preferred material for outer body 125 is Nafion™, a cation-selective perfluorosulfonate ionomer, that provides for diffusion of water to electrode 120.

In application, a brief (<1 sec in duration) large (>1 kV) DC voltage pulse is applied between electrodes 120. Electrolysis at the electrode/Nafion™ interface, cation transport within the region between body 125 and electrode 120, and electrolytic transport within the fluid result in a region of enhanced ion concentration at the anode Nafion™/fluid interface and a region of reduced ion concentration at the cathode Nafion™/fluid interface. The localized enhancement and depletion regions (pulses) are advected downstream by the flow to detector 150.

While the invention has been described and illustrated by means of a capillary tubes or microchannels, it is understood that the capillary tubes and/or microchannels themselves can be part of a microfluidic device or system. The microfluidic device or system can be comprised of channels, reservoirs, and arbitrarily shaped cavities that are fabricated using any of a number of art recognized microfabrication methods, including injection molding, hot embossing, wet or dry etching, or deposition over a sacrificial layer. The microfluidic device can also include holes and/or ports and/or connectors to adapt the microfluidic channels and reservoirs to external fluid handling devices. The term "microfluidic" refers to a system or device having channels or chambers that are generally fabricated on the micron or submicron scale, e.g., having at least one cross-sectional dimension in the range from about 0.1 μm to about 500 μm, i.e., microchannels.

Figure 3:
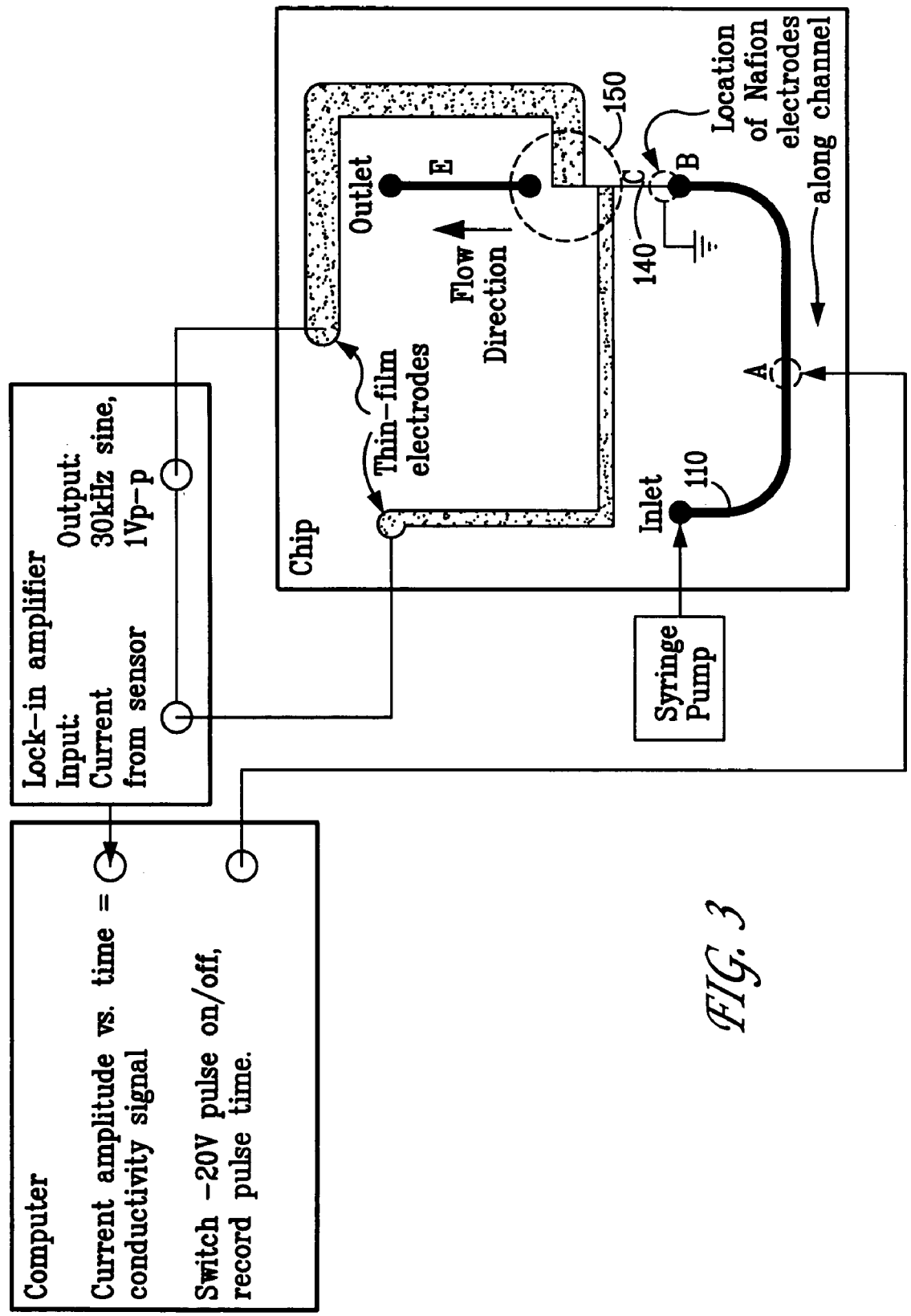
FIG. 3 is a microfluidic chip including an incorporated time-of-flight flow rate sensor.

The time-of-flight fluid flow rate sensor described above can be fabricated as part of a microfluidic device such as that shown generally in FIG. 3.

Fluid was pumped through flow channel 110 (50 μm deep, 100 μm wide and about 1 cm long) by pumping means, such as a syringe pump, and flowed between electrodes 120 located generally at points A and B along the flow channel. While the electrodes can be bare wires, it is preferable in microfluidic applications to use membrane electrodes, such as the Nafion™-based electrodes described above, to eliminate the formation of gas bubbles that can block fluid flow through the narrow microchannels or form high impedance obstructions to uniform fluid flow.

The Nafion™-based electrodes were fabricated by injecting a Nafion™ solution (supplied by Dupont as a 5–20% Nafion™ solution in alcohol and water) into a fritted glass capillary. The Nafion™ solution was forced through the pores of the frit using gas pressure and dried to form a 2 mm plug extending a small distance out from the entrance to the capillary. During drying, electrical contact was made to the Nafion™ by inserting a wire, preferably stainless and more preferably platinum, palladium, or gold, into the capillary.

Fluid flowed from flow channel 110 into flight tube 140 (3 μm deep, 50 μm wide and about 3 mm long). Sensor 150, comprising two opposing electrodes, was positioned at the exit end of the flight tube. After exiting the flight tube, fluid flowed into outlet tube E.

Figure 4:
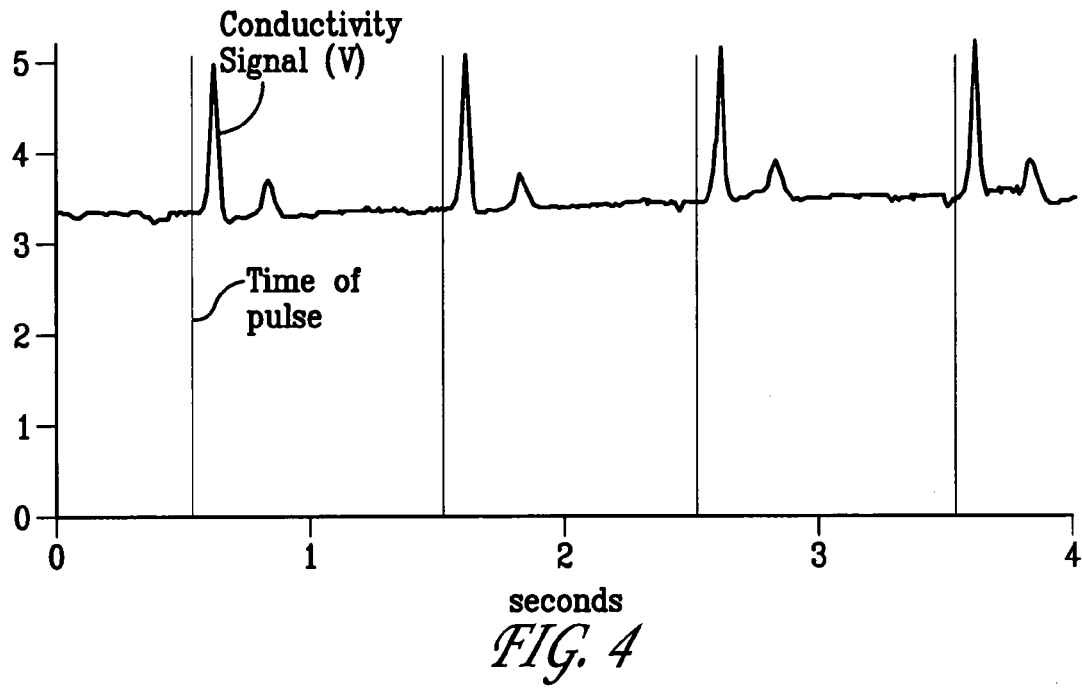
FIG. 4 shows the response of the mass flow sensor to a pulse train.

The ability of the time-of-flight flow sensor to measure fluid flow times reproducibly is illustrated in FIG. 4. A syringe pump was used to pump a solution of water and 0.1% trifluoroacetic acid (TFA) through the microfluidic device illustrated by FIG. 3 at flow rates ranging from 3.3 nL/min to 830 nL/min. As shown in FIG. 4, two sharp peaks in solution conductivity were observed after a voltage pulse was applied to the Nafion™ electrodes. In order to demonstrate the reproducibility of the method for measuring fluid flow rate, a series of voltage pulses was applied to the electrodes for a fluid flow rate of about 166 nL/min. As can be seen by reference to FIG. 4, the series of conductivity responses were substantially identical.

Figure 5:
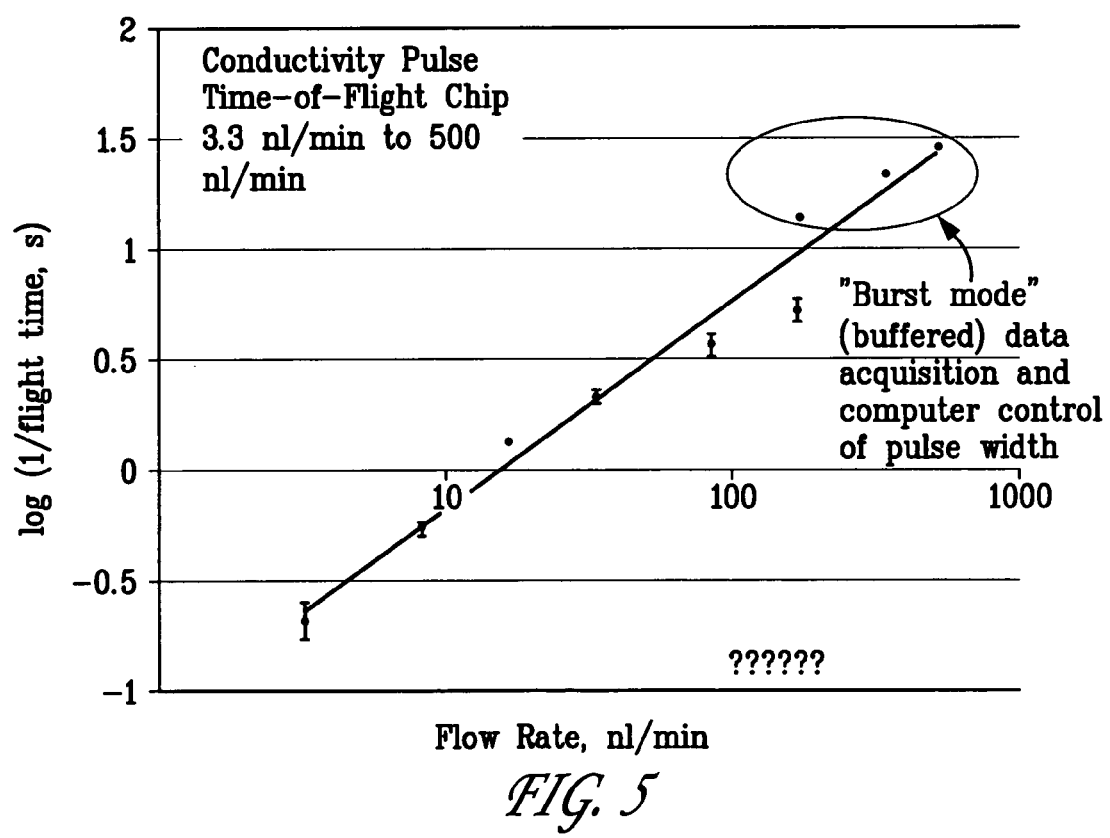
FIG. 5 is a plot of the reciprocal of the time-of-flight vs. flow rate.

The time-of-flight, i.e., the elapsed time between application of a voltage pulse and detection of the resulting change in conductivity of a fluid, for a series of fluid flow rates ranging from 3.3 nL/min to 830 nL/min was measured. For purposes of these measurements the time-of-flight was measured from application of the voltage pulse to the centerline of the first conductivity peak. The results of these measurements are shown in FIG. 5 where the logarithm of the reciprocal of the flight time (1/sec) is plotted vs. flow rate. The standard deviation for each data point, except the first, is less than 5% (based on at least 30 measurements).

Extensive investigations by the inventors have shown that the sensor configuration disclosed above operates best in the flow rate range of from about 100 nL/min to about 600 nl/min. By way of example, for flow rates of less than 100 nL/min the response time was greater than about 0.2 sec limiting the rate at which flow rate measurements could be taken and thereby making it difficult to use the sensor data for controlling pumps. On the other hand, at higher flow rates (≈1000 nL/min) the short time of flight was a source of noise due to the limited number of data samples that could be taken. While the spacing between the electrode pair could be made smaller, thereby decreasing the response time for the low flow rate condition this solution would only exacerbate the short time of flight experienced for flow rates in excess of about 600 nL/min. In order to overcome this problem, it has been found desirable to employ a three electrode system such as that shown in FIG. 6.

Figure 6:
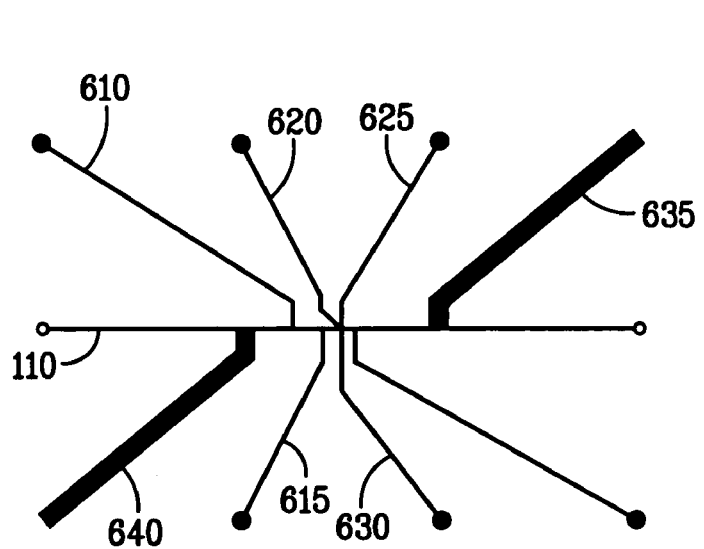
FIG. 6 shows a three electrode embodiment of the invention.
Figure 6:
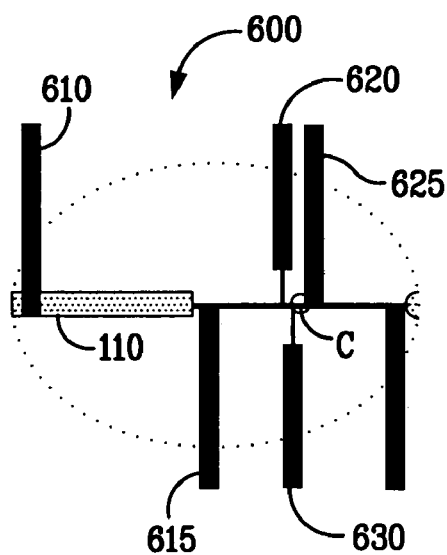

Referring now to FIG. 6. As before, the flow sensor electrodes are disposed in flow channel 110 that can be a capillary tube, a microchannel, or a microfabricated microfluidic chip. The three electrode flow sensor indicated generally at 600 is comprised of electrodes 610, 615, and 620 that together define the working electrode configuration. Electrodes 625 and 630 define the conductivity sensing region, designated as C in FIG. 6. In this region electrodes 625 and 630 sense changes in conductivity of the fluid resulting from compositional variations produced by electrolysis of the solvent (e.g., water), electrolysis of a dissolved species, or electrolysis of a dissolved ionic species, as discussed above.

In order to accommodate the flow rates of interest, typically from about 10 nL/min to about 10 μL/min, the electrodes can be spaced a distances that provide for time of flight measurements of from 20 ms to about 200 ms and data update rates between 10 and 60 Hz. Thus, for slow range electrodes (flow rates <100 nL/min) a gap of about 75 microns was provided between pulse injection and the conductivity sensing region. For medium range flow rates (flow rates >100 nL/min and <600 nL/min) a gap of about 500 microns was provided between pulse injection and the conductivity sensing region. And for fast flow rates (>600 nl/min) the gap was about 1.4 mm.

In operation, a voltage pulse is applied to adjacent pairs of electrodes. Generally, a voltage pulse of about −110 V is applied to the electrode immediately upstream of the grounded electrode for about 1 ms. The short pulse time is selected in order to keep the concentration of oxygen gas below that required to form bubbles that could change the fluid flow regime. As discussed above, membrane electrodes (electrodialysis) can also be used to eliminate gas bubbles.

In the "fast" mode the voltage pulse is applied to electrode pair 610 and 615. For medium range flow rates, the voltage pulse is applied between electrodes 615 and 620 and, for slow flow rates, between electrodes 620 and 625. The pulse, formed at the leading edge of the electrode advects to the conductivity sensing region. As above, the time elapsed between formation of the composition pulse and its arrival at the detection electrodes is used to determine fluid flow rate.

It has been found to be preferable to dispose the electrode system in a channel proportioned to provide conveniently short pulse flight times, preferably less than 1 second, typically having a length to hydraulic diameter ratio greater than 10.

The composition pulse is detected as a change in conductivity of the liquid. The conductivity pulse is detected at region C of the flow sensor using a pair of closely-spaced electrodes (625 and 630), preferably platinum electrodes. One of the sensing electrodes is modulated with a small amplitude (<1000 mV) periodic driver signal, such as an AC sine wave, at a frequency of between about 100 Hz to 100 kHz with little or no DC bias. An AC current having the modulation frequency is collected from the second of the pair of sensing electrodes and is connected to the input of a low-input impedance circuit. The unprocessed signal is amplitude-modulated relative to the detector driver signal, wherein the fluid conductivity corresponding to the amplitude of the modulating waveform.

Electrodes 635 and 640 are added as backflow sensors. Typically, voltage pulse greater than about 110 V is applied between this electrode pair to determine the direction of fluid flow. The voltage pulse is detected at the conductivity sensing electrode pair (625/630). A positive-going pulse indicates forward fluid flow while a negative-going pulse indicates reverse flow The three electrode flow sensor described above can be fabricated by methods known to those skilled in the art. Typically:
Coat a clean a glass wafer with a 0.2 μm silicon hardmask layer;
Etch a deep channel pattern into the hardmask using photoresist and a fluorine-containing silicon plasma;
Etch deep (50–100 μm) areas of the glass wafer with HF using the hardmask;
Overlay the shallow channel pattern onto a new photoresist layer on the existing hardmask and etch the pattern into the hardmask;
Etch both the shallow and deep areas with HF (3–5 μm deep) into the wafer;
Remove the photoresist and hardmask layers;
Pattern a new layer of photoresist with the electrode pattern;
Etch the glass wafer 0.1–0.2 μm to countersink electrodes;
Deposit a metal adhesion layer and an overlaying electrode layer to fill etched areas through existing resist pattern;
Strip off photoresist, lifting off excess metal;
Drill via hole in glass cover plate;
Clean wafer and cover plate surfaces by immersing in sodium hydroxide solution;
Thermal bond drilled cover plate by high temperature thermal diffusion;
Attach stainless steel metal wire contacts to the Pt electrodes by silver epoxy or preferably by soldering.

It has been found that both Ti and Ta adhesion layers were able to withstand the operating conditions prevalent in a microfluidic flow sensor device without peeling. However, an additional constraint on the use of an adhesion layer is the ability to withstand the cleaning steps prior to wafer bonding and the high temperature thermal bonding process itself; conditions that have been found to damage the Ti adhesion layer. Consequently, for the flow sensor device Ta is the preferred adhesion layer material. However, the combinations of Ta/Pt and Ti/Pt have been found to be satisfactory sensing electrodes.

Figure 7:
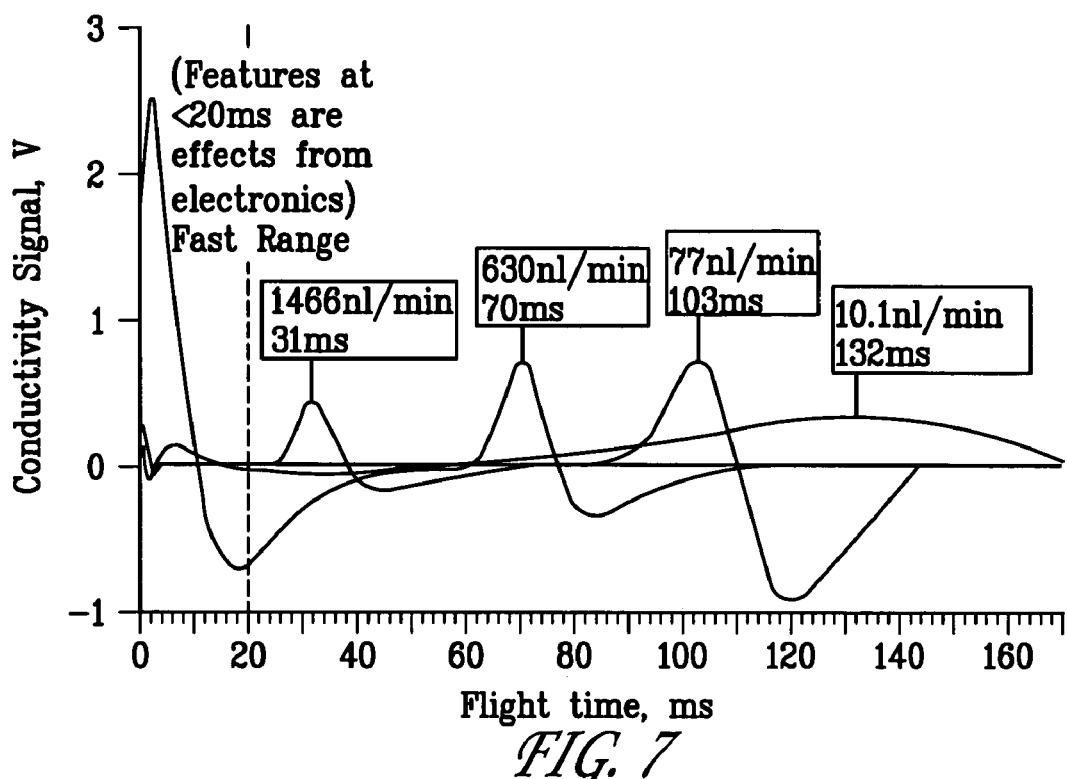
FIG. 7 shows a plot of conductivity vs. flight time for three measurement ranges.

Referring now to FIG. 7 which shows representative conductivity traces (magnitude of the conductivity signal (V) vs. flight time (ms)) for the three measurement ranges; slow range (10.1 and 77 nL/min), medium range (630 nL/min) and fast range (1466 nL/min). It can be seen that the novel three electrode system described hereinabove was not only capable of measuring flow rates covering two orders of magnitude (>1000 nL/min to 10 nL/min) but also provided a measurable signal at 5 Hz even at flow rates as small as 10 nL/min.

It should be noted that in FIG. 7 the pulse was applied at t=0 and the features shown at times less than about 20 ms were artifacts arising from the electronic interactions.

Figure 8:
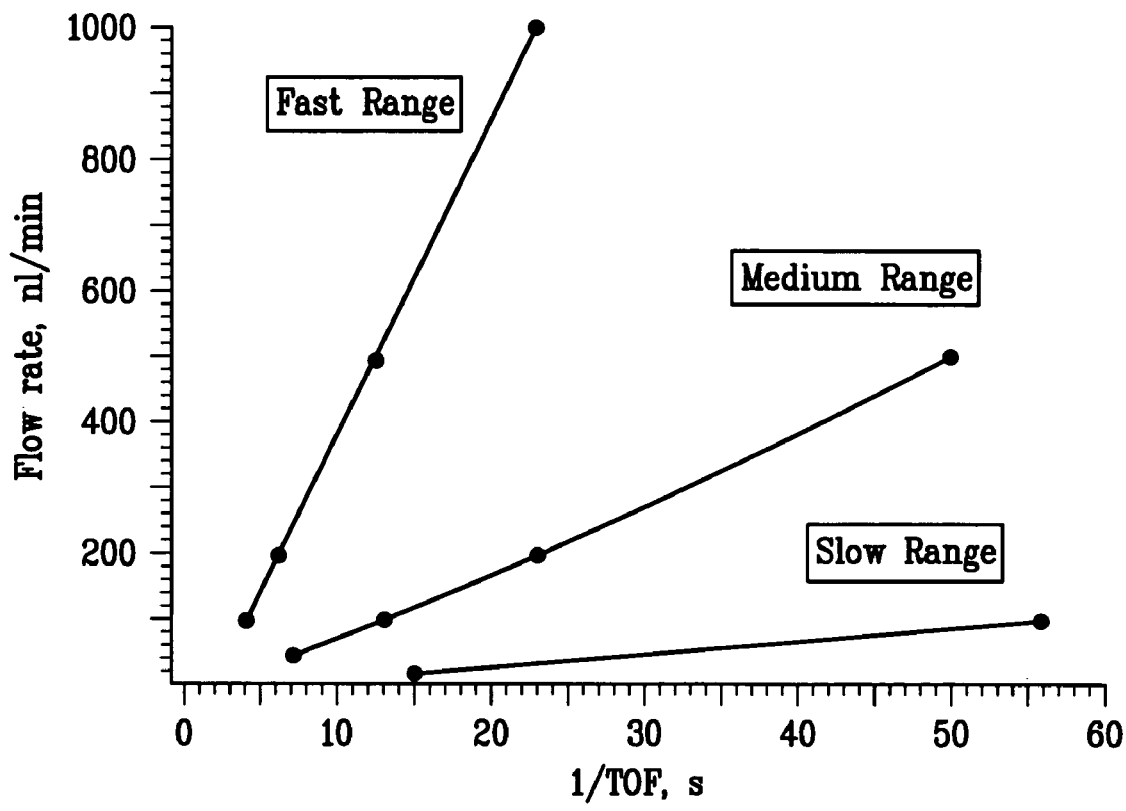
FIG. 8 shows calibration curves for a three electrode system.

A calibration curve for the three electrode embodiment is shown in FIG. 8 as the relationship between flow rate (nL/min) and 1/t(s), where t is the measured time-of-flight for the fast (≈100–1000 nL/min), medium (≈20–500 nL/min) and slow (≈10–100 n/min) flow rate ranges, for a solution of 5 mM tris methoxyaminomethane (TRIS) at pH 8. Between 100 and 500 measurements were collected at each flow rate to construct the calibration curve. The relationship between flow rate and time-of-flight was found to be linear for each flow rate range with an error in time-of-flight determined to be smaller than the data points shown.

The examples above are intended to be illustrative of the application of the present invention and are not to be construed as a limitation or restriction thereon, the invention being delineated in the claims.

In summary, the present invention relates to a device that can operate at pressures as great as 2,000 psi for measuring fluid flow rates generally, and particularly in microchannels, over a wide range of flow rates (<1 nL/min to >10 μL/min). Electrochemical means are used to produce localized compositional variations in a flowing fluid at distinct locations along the flow axis. The compositional variation, or pulse, that is subsequently detected downstream from its point of creation is used to derive a flow rate.

We claim:

1. A device for measuring the flow rate of a fluid in a flow channel, comprising:
    means for creating localized compositional variations in the fluid along the flow axis;
    means for subsequently detecting the compositional variation at a point downstream from its point of creation; and
    means for measuring flight time, wherein said device is capable of measuring flow rates from less than about 1 nL/min to greater than about 10 μL/min at pressures as great as 2,000 psi.

2. A device of claim 1, wherein said means for producing localized composition variations comprises, in combination:
    spaced-apart electrodes disposed along the fluid flow axis in the flow channel and means for applying a voltage pulse to said electrodes.

3. The device of claim 2, wherein said spaced apart electrodes comprise a pair of spaced apart electrodes.

4. The device of claim 2, wherein said means for producing comprises at least three spaced-apart electrodes disposed along the fluid flow axis in the flow channel.

5. The device of claim 4, wherein said three electrodes are disposed in a proportioned channel having a length to hydrodynamic diameter ratio greater than 10.

6. The device of claim 4, wherein said three electrodes are spaced at unequal distances from each other.

7. The device of claim 6, wherein the spacing distance is determined by the flow rate range to be measured.

8. The device of claim 4, wherein the electrodes comprise an adhesion layer of tantalum and a metal layer disposed thereon.

9. The device of claim 5, wherein the metal layer is platinum.

10. The device of claim 4, wherein the electrodes comprise an outer body fabricated from a microporous material and an inner metal electrode.

11. The device of claim 10, wherein the microporous material is a porous glass or an ionomer material.

12. The device of claim 11, wherein the ionomer material is a cation-selective perfluorosulfonate ionomer.

13. The device of claim 1, wherein compositional variation includes changes in pH.

14. The device of claim 1, wherein said means for detecting is disposed in a flight tube attached to the fluid exit of the flow channel and concentric with the flow channel, and wherein the internal diameter of the flight tube is less than that of the flow channel.

15. The device of claim 14, wherein the flight tube has a length about 4 times greater that its diameter.

16. The device of claim 1, wherein said means for detecting is a conductivity sensor.

17. The device of claim 1, wherein the electrodes include stainless steel, platinum, palladium, or gold.

18. The device of claim 1, wherein the electrodes comprise an outer body fabricated from a microporous material and an inner metal electrode.

19. The device of claim 18, wherein the microporous material is a porous glass or an ionomer material.

20. The device of claim 19, wherein the ionomer material is a cation-selective perfluorosulfonate ionomer.

21. A device for measuring fluid flow rates, comprising:
a substrate fabricated to define a microchannel system disposed thereon, the microchannel system, in part, comprising:
a flow channel;
a pair of spaced-apart electrodes disposed along the fluid flow axis in the flow channel;
means for applying a voltage pulse to said pair of electrodes, to produce a variation in the composition of the fluid;
means for detecting the compositional variation; and
means for measuring flight time.

22. The device of claim 21, wherein the electrodes comprise an outer body fabricated from a microporous material and an inner metal electrode.

23. The device of claim 22, wherein the microporous material is a porous glass or an ionomer material.

24. The device of claim 23, wherein the ion selective material is a cation-selective perfluorosulfonate ionomer.

25. The device of claim 21, wherein said device is capable of measuring fluid flow rates at pressures as great as 2,000 psi.

26. The method of claim 25, wherein said step of producing comprises applying a voltage of about 110 V for about 1 ms.

27. A method for measuring fluid flow rates, comprising:
providing a fluid flow channel;
flowing fluid through the flow channel;
producing a compositional variation in the fluid;
detecting the compositional variation; and
measuring the flight time of the variation.

28. An electrode for electrokinetic systems, comprising:
an outer body fabricated from a microporous material and an inner metal electrode.

29. The electrode of claim 28, wherein the microporous material is a porous glass or an ionomer material.

30. The device of claim 29, wherein the ion selective material is a cation-selective perfluorosulfonate ionomer.

31. A device for measuring fluid flow rates, comprising:
a substrate fabricated to define a microchannel system disposed thereon, the microchannel system, in part, comprising:
a flow channel;
at least three spaced-apart electrodes disposed along the fluid flow axis in the flow channel;
means for applying a voltage pulse to pairs of electrodes, to produce a variation in the composition of the fluid;
means for detecting the compositional variation; and
means for measuring flight time.

32. The device of claim 31, wherein said three spaced-apart electrodes are disposed in a channel having a length to hydrodynamic diameter ratio greater than 10.

33. The device of claim 31, wherein said three spaced-apart electrodes are spaced at unequal distances from each other.

34. The device of claim 32, wherein the spacing distance is determined by the flow rate range to be measured.

35. The device of claim 31, wherein said means for detecting is a conductivity sensor.

36. The device of claim 31, wherein the electrodes comprise an adhesion layer of tantalum and a metal layer disposed thereon.

37. The device of claim 36, wherein the metal layer is platinum.

38. The device of claim 32, wherein the electrodes comprise an outer body fabricated from a microporous material and an inner metal electrode.

39. The device of claim 38, wherein the microporous material is a porous glass or an ionomer material.

40. The device of claim 39, wherein the ionomer material is a cation-selective perfluorosulfonate ionomer.

* * * * *